J. H. A. BOUSFIELD.
SCALE.
APPLICATION FILED JULY 12, 1918.

1,346,481.

Patented July 13, 1920.
3 SHEETS—SHEET 1.

Inventor
John H. A. Bousfield

By Whittemore Hulbert & Whittemore
Attorneys

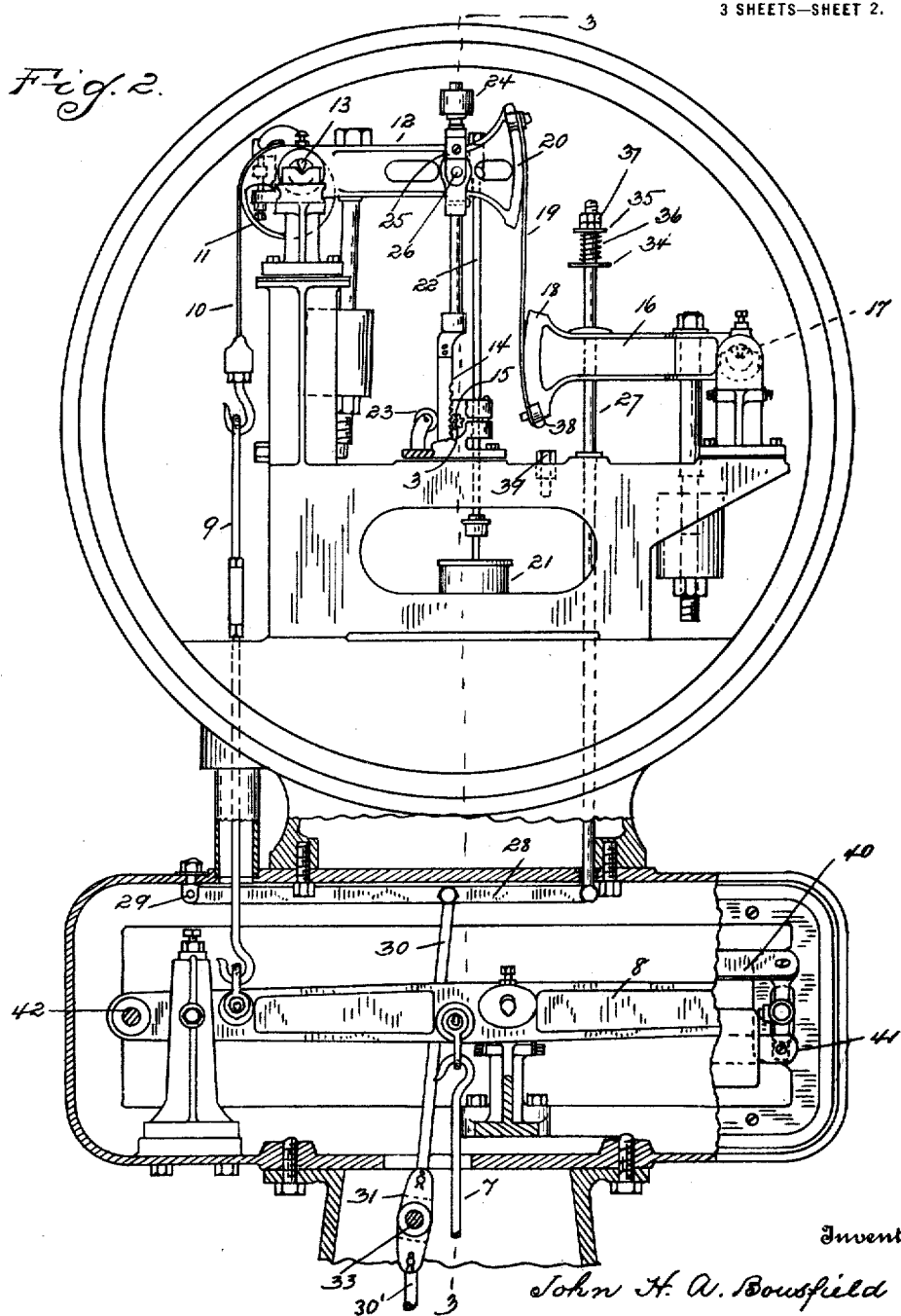

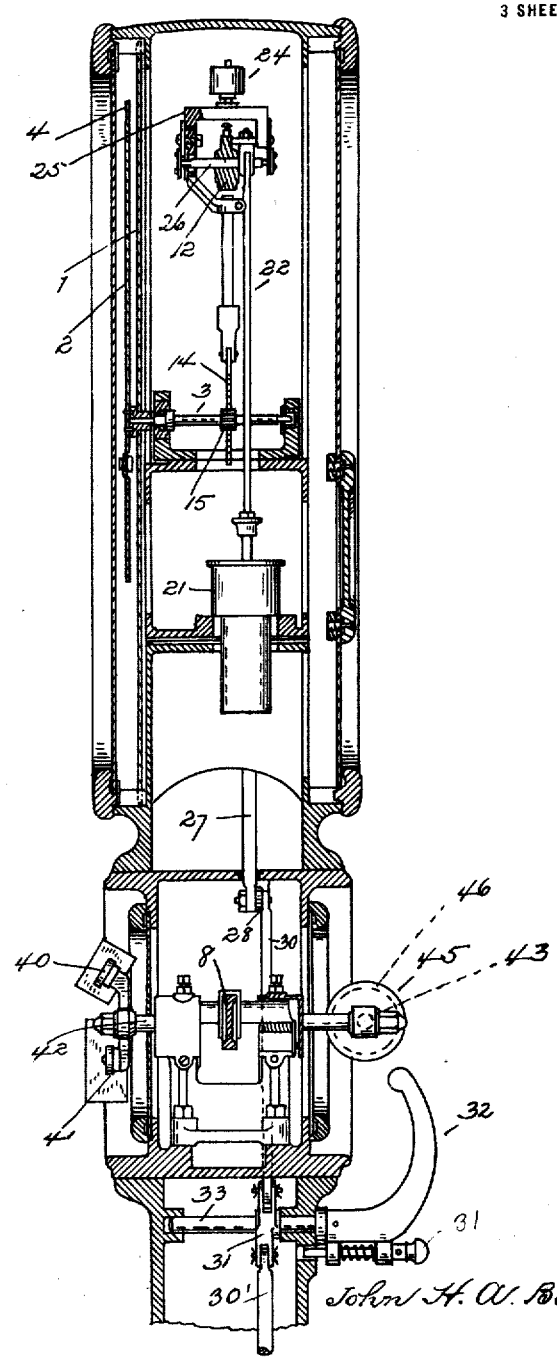

UNITED STATES PATENT OFFICE.

JOHN H. A. BOUSFIELD, OF ST. JOHNSBURY, VERMONT, ASSIGNOR TO E. AND T. FAIRBANKS AND COMPANY, OF ST. JOHNSBURY, VERMONT, A CORPORATION OF VERMONT.

SCALE.

1,346,481.              Specification of Letters Patent.        Patented July 13, 1920.

Application filed July 12, 1918. Serial No. 244,536.

*To all whom it may concern:*

Be it known that I, JOHN H. A. BOUSFIELD, a citizen of the United States of America, residing at St. Johnsbury, in the county of Caledonia and State of Vermont, have invented certain new and useful Improvements in Scales, of which the following is a specification, reference being had therein to the accompanying drawings.

This invention relates to scales and refers more particularly to portable dial scales, although various features of the invention are not necessarily limited to the particular type of scale mentioned.

One of the main objects of this invention is to provide an improved compensating mechanism which will eliminate the possibility of a change in balance even though the scale should be placed out of level.

The invention also resides in the means for preserving the sensitiveness of the scale; in the provision for preventing excess friction being produced on certain parts of the mechanism when the scale is out of level; in the novel attachment of the auxiliary beam and tare beam; and in such further features of construction and arrangements and combinations of parts as will more fully hereinafter appear.

In the drawings:

Fig. 2 is a front elevational view, partly in section, of the upper part of a scale embodying my invention;

Fig. 3 is a cross-section on line 3—3 of Fig. 2;

Figure 1:
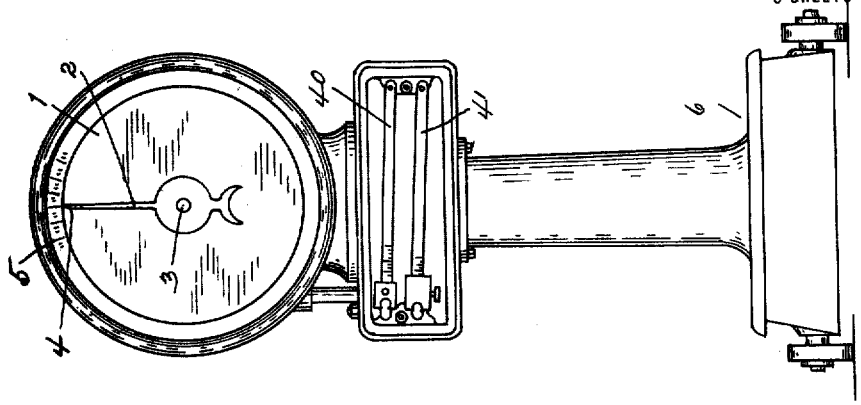
Figure 1 is a front elevational view of a scale embodying my invention.
Figure 4:
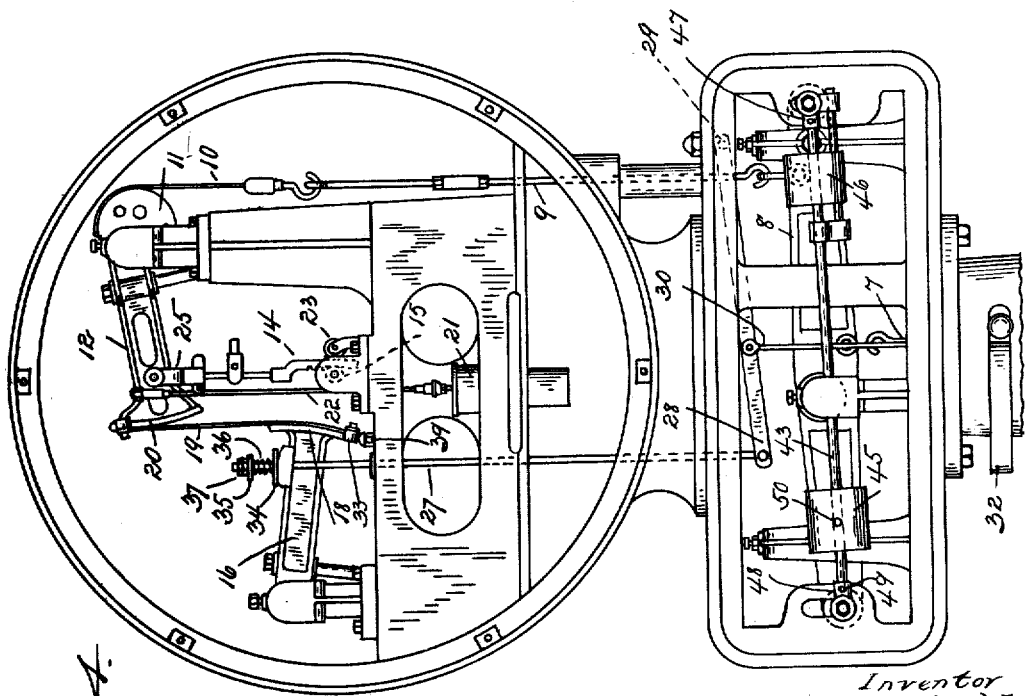
Fig. 4 is a rear elevational view of the parts shown in Fig. 1.

Describing in detail the construction shown in the drawings and referring first to the general arrangement of parts, 1 designates the dial of a scale, and 2 the indicator which is mounted on the revolving spindle 3 and is adapted to travel around the face of the dial to indicate the amount of weight placed on the scale, the indications being by the position of the dial point 4 on the dial readings 5. The weight placed on the platform 6 is applied through the main levers of the scale and the rod 7 to the beam lever 8. The last-mentioned lever is connected by a rod 9 and tape 10 to an eccentric 11 which is directly connected to a pendulum arm 12 which is pivoted at 13. Connection between the pendulum arm and the beam lever is made by the tape 10 passing around a portion of the circumference of the eccentric 11. Suspended from the arm 12 is a rack 14 which engages a pinion 15 on the shaft 3. A roller 23 serves to hold the rack in engagement with the pinion so that the movement of the beam 8 caused by the load on the platform will, through the band 10, eccentric 11, arm 12 and rack and pinion, be transmitted to the shaft 3 so as to move the indicator 2 a proportionate amount.

In scales, particularly those of the portable type, difficulty is encountered in maintaining the accuracy of the scale when it is placed out of level. To produce the necessary compensating effect I employ an auxiliary pendulum or arm 16 which is pivoted at 17 and has its segmental end 18 connected by a tape 19 to the segmental end 20 on the arm 12. Since the arms 12 and 16 extend in opposite directions and are connected as above described, the placing of the scale on an uneven floor or otherwise out of level will not affect the scale balance. For steadying the action of the scale the dash-pot 21 is provided, this dash-pot being connected by a rod 22 to the pendulum arm 12.

In addition to the compensating mechanism above described there is additional means provided for preventing undue friction between the rack 14 and the roller 23 or the pinion 15. In case the scale was set considerable out of level there might be undue friction produced between the rack and the roll 23 owing to the rack falling back and engaging with the roll; it being understood that the function of the roll 23 is merely to prevent the rack from getting out of mesh with the gear. In case the scale is tipped too far out of vertical position, friction thus produced would tend to destroy the sensitiveness of the scale, and to overcome this objection a counter-balance weight 24 is attached to the yoke 25, the connection of the rack to the main pendulum arm 12 being made by means of a pivot 26 passing through the yoke 25. Therefore if the scale is tipped to the right of the vertical position shown in Fig. 1, the weight 24 will offset any tendency of the rack 14 to move back against the roller 23.

In transporting the scale from place to place it is necessary to provide means for preventing the delicate dial mechanism and the various connections from shaking out of place. For this purpose an arrangement of parts is provided which will serve to lock the whole mechanism through a rod 27. This rod at its lower end is connected to a locking bar 28 which is pivoted at 29 and in turn is connected to a link 30, which link in turn connects with a crank 31 operated from the rear of the scale by a lever 32 fixed to the shaft 33 of the crank 31. At its upper end the rod or locking bar 27 has a washer 34, between which and the washer 35 there is a spring 36 sleeved on the locking bar 27. The position of the washer 35, which forms the fixed abutment on the locking bar 27, can be changed by adjusting the locking nuts 37. Whenever the handle 32 is rotated to draw the rod 30 downward it will, through the locking bar 28, draw the rod 27 downward so as to bring the washer 34 against the upper edge of the auxiliary pendulum 16. Further downward movement of the bar 27 will draw the lower end 38 of the pendulum down into engagement with the adjustable stop 39.

30' is a rod connected to the crank 31 and to a foot member (not shown) which is extensible below the scale platform to hold the scale stationary when the indicating mechanism for the scale is unlocked. 31' is a longitudinally movable spring pressed member upon the lever 32 for holding the same in its adjusted positions.

Since the pendulum 16 is tied to the pendulum 12, both pendulums, the rack, the pointer and other moving parts will all be locked in fixed position. After the scale has been moved to its new position and is ready for use it is only necessary to rotate the handle 32 in the opposite direction and return the bar 27 and the washer 34 to the position shown in Fig. 2.

In order to give greater capacity to the scale beyond that of the dial, there is preferably employed an auxiliary beam 40 and a tare beam 41. For mounting these parts the following mechanism is employed so that there will be an equal pressure on each side of the supporting bar. In detail the auxiliary beam and tare beam are attached to the main beam lever 8 by means of studs 42 which pass through to the back side of the scale and a supporting rod 43, which is used for carrying the balance weight 45. This weight 45 is arranged to apply equal pressure to each side of the main beam lever, while the supporting rod also forms a support for the balance ball 46 which is used for keeping the scale in balance. The supporting rod 43 is held by means of two castings 47 and 48 applied to the rod 43 and held in position by means of dowel pins 49. The ball 45 in addition to its function of counteracting the weight of the auxiliary and tare beams applied to the front side of the scale also serves to balance the weight of the platform, as the ball can be slid along in a horizontal direction on the rod 43 until it reaches a proper balanced point.

When this final position is determined it is then securely fastened by means of a taper pin 50. Thus in setting up the scale the parts can be very accurately balanced and after the proper positions are once determined can be securely set. Also in moving the scale from place to place this balance is preserved by the particular locking arrangement described.

In order to take care of inequalities in the manufacture the stops 39 are provided with a screw adjustment and the arrangement of the coil spring on the locking bar or rod 27 permits of a positive clamping movement. Moreover, in using the scale it is not absolutely necessary to level it up as the compensating arrangement of the pendulum arms 12 and 16 and the arrangement of the pendulum and eccentric will insure the balance of the scale and its proper operation even though it is out of vertical alinement.

What I claim as my invention is:—

1. In a scale, the combination with a lever, of a pendulum arm, a connection therebetween including an eccentric directly connected to the pendulum arm, a tape extending around a portion of the circumference of the eccentric and connected to said lever, compensating means for maintaining the scale in balance when the scale is placed out of level, said compensating means comprising an oppositely extending auxiliary pendulum arm, and a tape connection between said pendulum arms.

2. In a scale, the combination with a lever, of a pendulum arm, a connection therebetween including an eccentric directly connected to the pendulum arm, a dial having a rotatable indicator, a rack and pinion for actuating said indicator from said arm, a roll for preventing the rack from getting out of mesh with the pinion, and a counterbalance for the rack for preventing change in pressure of the rack and pinion and roll when the scale is placed out of level.

3. In a scale, the combination with a main pendulum arm actuated by the load, of an auxiliary pendulum arm arranged to be simultaneously actuated in the opposite direction by said main pendulum arm so as to maintain the scale in balance when placed out of level, and a lock for said pendulum arms comprising a single locking bar engaging said auxiliary pendulum only.

4. In a scale, the combination with a main pendulum arm actuated by the load, of an auxiliary pendulum arm arranged to be simultaneously actuated in the opposite direction so as to maintain the scale in balance when placed out of level, a lock for said scale comprising a locking bar engaging said auxiliary pendulum, and an adjustable stop against which the auxiliary pendulum arm is brought in the locking position of said locking bar.

5. In a scale, the combination with a main pendulum arm actuated by the load, of an auxiliary pendulum arm arranged to be simultaneously actuated in the opposite direction so as to maintain the scale in balance when placed out of level, and a locking bar operable from the exterior of the scale, said locking bar having a washer sleeved thereon and a spring compressed by the washer when the locking bar is adjusted to draw the latter into engagement with the auxiliary pendulum arm.

6. In a scale, the combination with a beam lever, a pendulum arm and a direct connection therebetween including an eccentric directly connected to the pendulum arm, a tape extending around a portion of the circumference of the eccentric and connected to said lever, an indicator, a rack for actuating said indicator suspended from the pendulum arm, an auxiliary pendulum arm connected to the first-mentioned pendulum arm, and a locking member for locking the auxiliary pendulum arm and thereby locking each of said scale parts.

7. In a scale, the combination with a lever, of a pendulum arm connected thereto, a dial having a rotatable indicator, a rack and pinion for actuating said indicator from said arm, a roll for preventing the rack from getting out of mesh with the pinion, and a counter-balance for the rack for preventing change in the pressure of the rack and pinion and roll when the scale is placed out of level.

8. In a scale, the combination with a beam lever, of an auxiliary beam and tare beam connected to said beam lever at one side thereof, a supporting rod connected to said beam lever at the opposite side thereof, a balance weight upon said supporting rod arranged to apply an equal pressure to each side of said beam lever, and a second balance weight slidably engaging said supporting rod for maintaining the scale in balance.

In testimony whereof I affix my signature in presence of two witnesses.

JOHN H. A. BOUSFIELD.

Witnesses:
THEODORA PUFFER,
G. A. BATSON.